United States Patent [19]

Okamura

[11] Patent Number: 4,819,103
[45] Date of Patent: Apr. 4, 1989

[54] APPARATUS FOR REPRODUCING DATA FROM MAGNETIC RECORDING MEDIUM

[75] Inventor: Hiroshi Okamura, Tokyo, Japan

[73] Assignee: Kabushiki Kaisha Toshiba, Kawasaki, Japan

[21] Appl. No.: 126,633

[22] Filed: Nov. 30, 1987

[30] Foreign Application Priority Data

Nov. 29, 1986 [JP] Japan .................................. 61-284541

[51] Int. Cl.$^4$ ............................ G11B 5/09; G11B 5/03
[52] U.S. Cl. ........................................... 360/51; 360/66
[58] Field of Search ......................... 360/51, 50, 66, 61

[56] References Cited

U.S. PATENT DOCUMENTS

| 4,584,616 | 4/1986 | Allen | 360/50 |
| 4,646,281 | 2/1987 | Verboom | 369/59 |
| 4,688,205 | 8/1987 | Abiko | 369/59 |
| 4,724,493 | 2/1988 | Nakamura | 360/51 |

FOREIGN PATENT DOCUMENTS 0199584 10/1986 European Pat. Off. .
0200370 11/1986 European Pat. Off. .

OTHER PUBLICATIONS

Toshiba Review No. 154, Winter of 1985, pp. 18–22, "Barium Ferrite Perpendicular Recording Floppy Disk".

U.S. patent application Ser. No. 67,972 filed on Jun. 30, 1987.
U.S. patent application Ser. No. 66,974 filed on Jun. 29, 1987.

Primary Examiner—Vincent P. Canney
Attorney, Agent, or Firm—Finnegan, Henderson, Farabow, Garrett & Dunner

[57] ABSTRACT

A data reproduction apparatus is disclosed. Read data, which is a pulse signal, is output from a magnetic disk drive in accordance with the information read by a pre-erase type magnetic head. Based on the read data, a zero pattern detector detects sync data which is constituted by zero data of a predetermined number of bits. A flip-flop outputs a predetermined permit signal using an output signal of the zero pattern detector as a trigger pulse. When the permit signal is output, a PLL circuit locks on the read data to oscillate and output data pulses and window pulses. Upon reception of the data pulses and window pulses, a floppy disk controller reads out data recorded on the magnetic recording medium. From the read data, an erased area detector detects an erased area that is an area, which has been erased by an erase head of the magnetic head and in which no information is written by a read/write head. When the erased area detector detects the erased area, an inhibition circuit inhibits the flip-flop from outputting the permit signal in order to prevent the PLL circuit from locking on the read data reproduced from the erased area.

11 Claims, 6 Drawing Sheets

FIG. 3A TRACK FORMAT (PRIOR ART)

FIG. 3B ERASE HEAD (PRIOR ART)

FIG. 3C W/R HEAD (PRIOR ART)

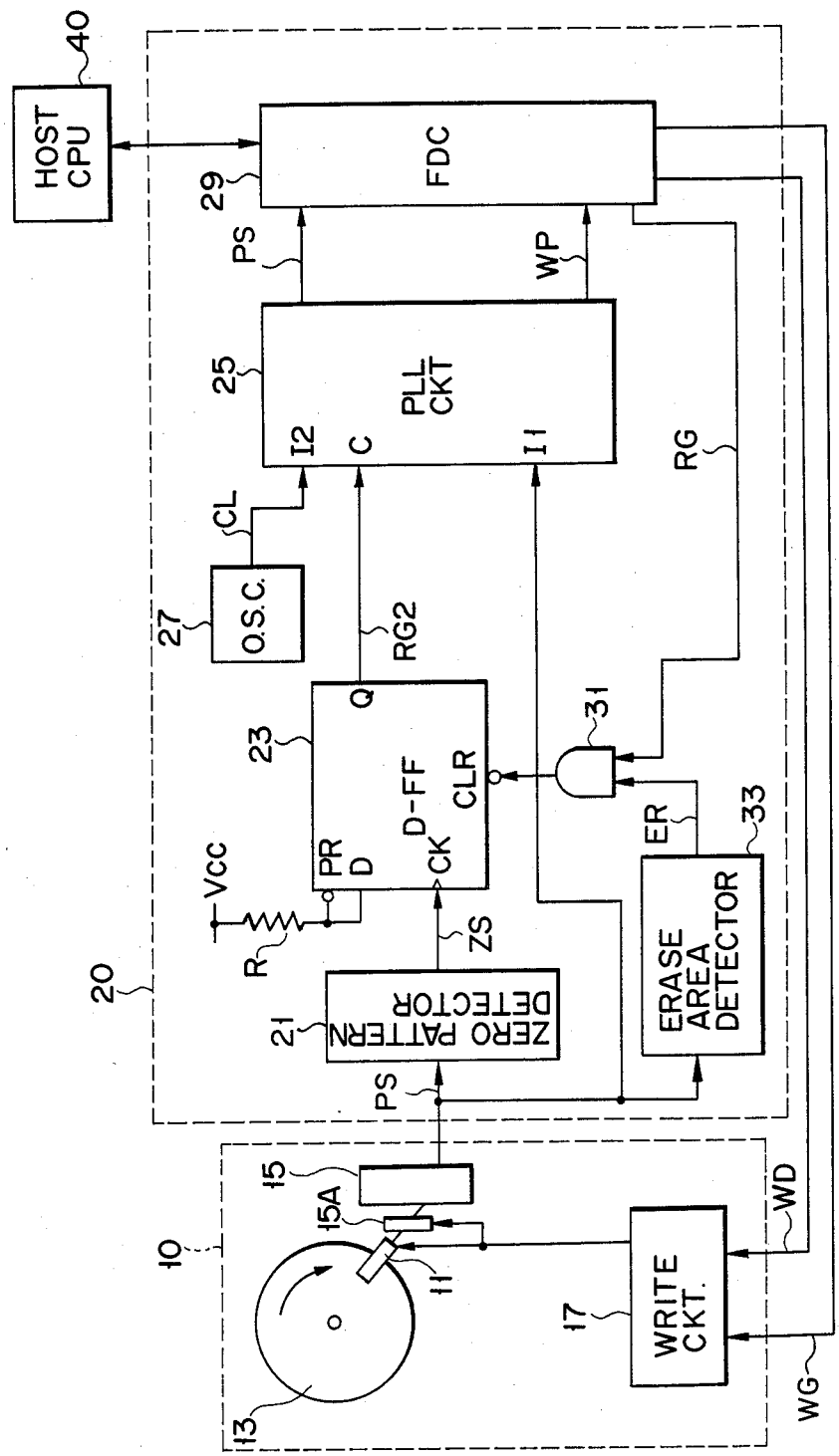
F I G. 4

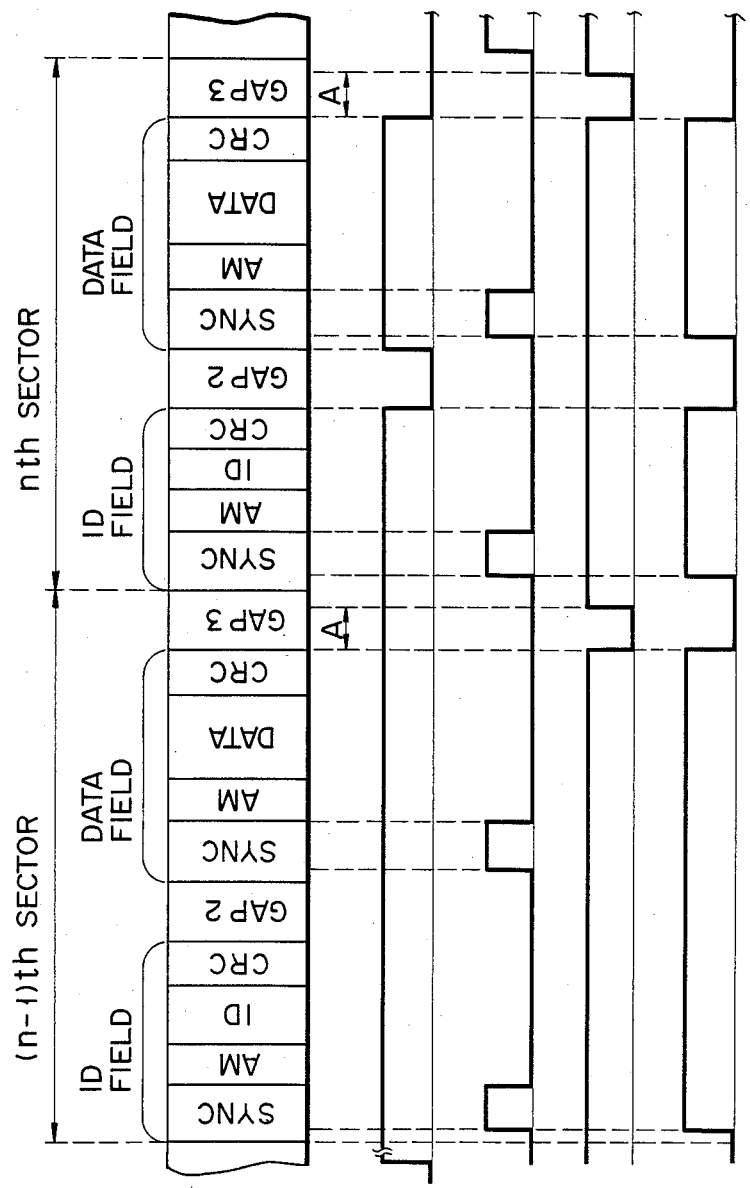

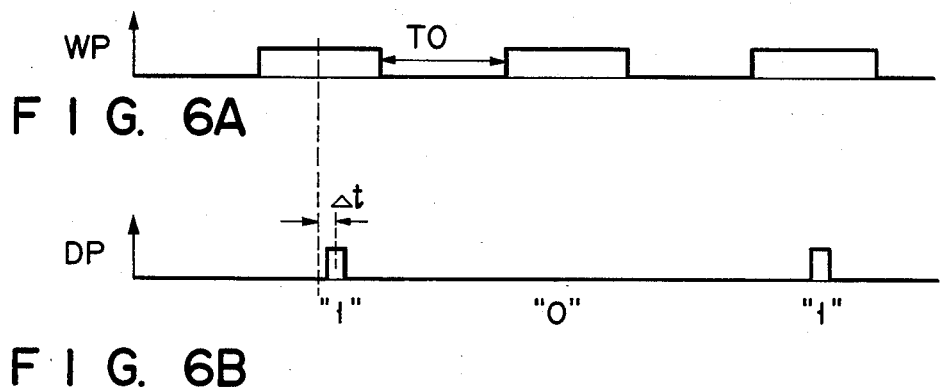
F I G. 6A
F I G. 6B
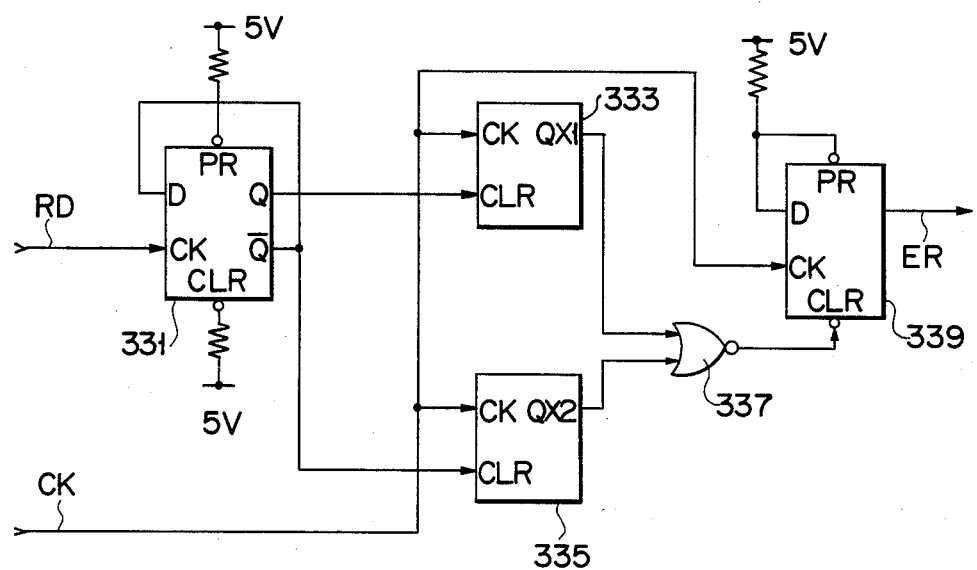
F I G. 7

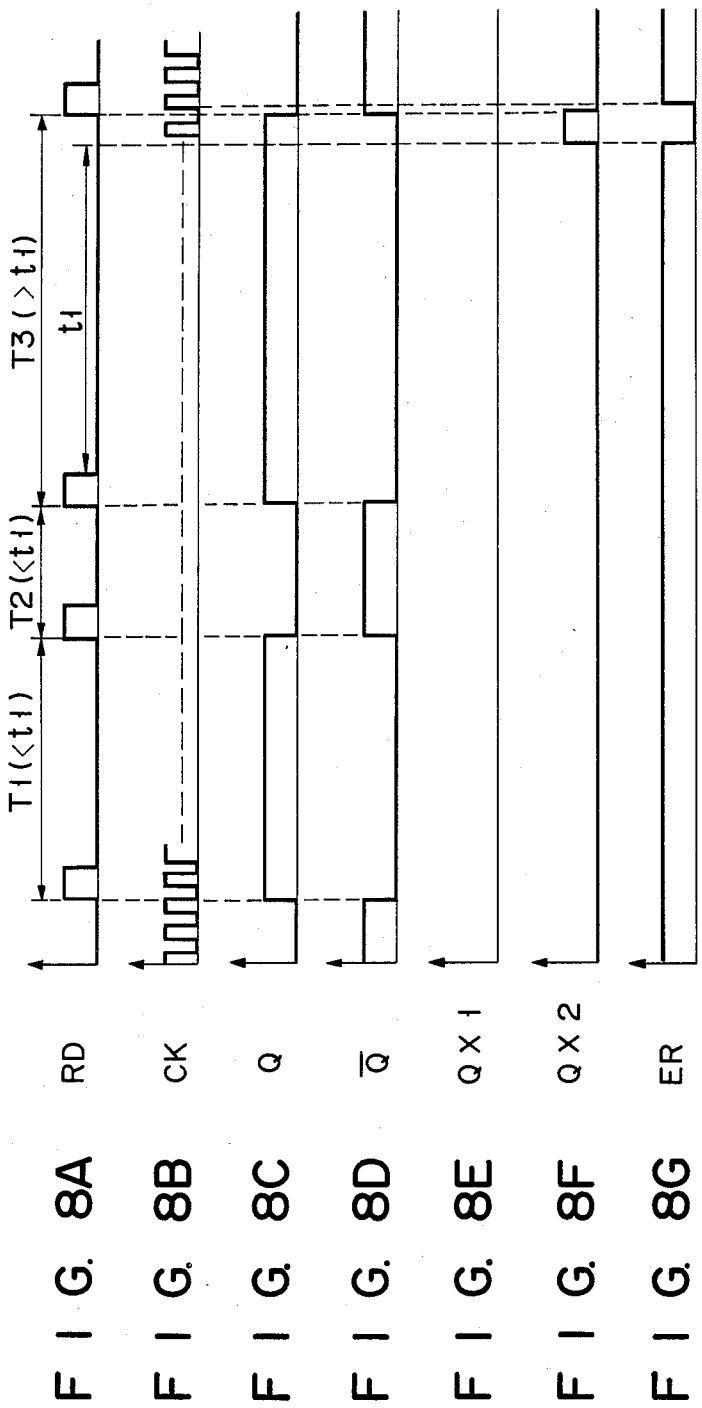

APPARATUS FOR REPRODUCING DATA FROM MAGNETIC RECORDING MEDIUM

BACKGROUND OF THE INVENTION

The present invention relates to a data reproduction circuit for reproducing data recorded on a magnetic recording medium, based on an output signal of a floppy disk apparatus which has a pre-erase type magnetic head.

In a floppy disk apparatus, a data reproduction circuit for reproducing data recorded by an MFM (Modified FM) recording system has a data separator using a PLL (Phase Locked Loop) circuit. The data separator separates data pulses and clock pulses from read data output from a floppy disk drive (FDD) and then outputs these pulses. The PLL circuit oscillates in synchronism with the read data and outputs a window pulse that indicates the timing for detecting the data and clock pulses.

The arrangement and operation of a conventional data reproduction circuit will be explained below referring to FIG. 1. In FIG. 1, when a read command is output from a host system (not shown), a floppy disk controller (FDC) (not shown) outputs to a flip-flop 2 a permit signal RG for permitting a read operation. Upon reception of the permit signal, flip-flop 2 becomes operable.

Read data RD, which has been read out from a magnetic recording medium (disk) by a magnetic head of a FDD and converted into a pulse signal, is supplied to a zero pattern detector (SYNC area detector) 1. The zero pattern detector 1 detects clock pulses, recorded as "0" data of a predetermined number of bytes in SYNC areas of a target track, from the read data RD. When detecting the clock pulse train recorded in the SYNC areas, zero pattern detector 1 outputs a detection signal ZS to a clock terminal of a flip-flop 2. Flip-flop 2 in turn outputs a read gate signal RG1 in synchronism with the rising of the detection signal ZS. Upon reception of the read gate signal RG1, a PLL circuit 3 oscillates, locking on the read data RD. PLL circuit 3 outputs window pulses WP to a data separator (not shown) synchronizing with the clock pulses from the SYNC areas and read data. Based on the window pulses from PLL circuit 3, the data separator separates the data pulses and the clock pulses from the read data with the window pulses. The separated data pulses and clock pulses are delivered to the FDC (not shown).

Recently, there have been developed high density recording disks (perpendicular recording type disks) which use a magnetic material such as cobalt-chromium (Co-Cr) and barrium-ferrite (Ba-Fe). The high density recording disks are constituted by a base coated with the magnetic material such as Co-Cr. Reproduction of signals having a high frequency from the high density recording disks requires a magnetic head with a short gap length in order to reduce a gap loss of the magnetic head. However, the shorter the gap length, the smaller the magnetization region in the thickness direction of the disks. With the present state-of-the-art coating technique of the magnetic material, it is difficult to make the coated thickness of the magnetic material to below 1 $\mu$m. Therefore, the magnetic head with a short gap length may not be able to perform magnetization saturation recording over the entire region of the high density recording disk in its thickness direction. If the magnetization saturation recording cannot be performed over the entire disk region in the thickness direction, new recorded signals are recorded on the disk with old signals which have been recorded partially remaining thereon. That is, the overwrite characteristic (data rewriting characteristic) for the disk would be deteriorated.

As a solution to this problem, a pre-erase type magnetic head with the structure as shown in FIG. 2 (bottom view) has been proposed. As illustrated in FIG. 2, this magnetic head is constituted by a read/write head 8 and an erase head 9, which is located prior to the head 8 in the rotational direction (arrow Z) of a disk and is combined with the former head through a separator 10. Erase head 9 has a wider erase gap 9a of long gap length while read/write head 8 has a narrow read/write gap 8a of short gap length. In FIG. 2, D is the distance between erase gap 9a and read/write gap 8a. The pre-erase type magnetic head uses erase head 9 to widely and deeply erase data on a track and then uses read/write head 8 to record data on the erased track. According to the pre-erase type magnetic head, therefore, the overwrite characteristic is not deteriorated even if the gap length of the read/write head is short.

For a pre-erase type magnetic head, it is desirable that an erase operation should be completed a predetermined time before completion of an operation for recording data on a magnetic recording medium. Normally, however, erase head 9 and read/write head 8 are simultaneously turned on or off. Consequently, read/write gap 8a and erase gap 9a on a track at the time the magnetic head is ON or OFF would have positional relationships as illustrated in FIGS. 3B and 3C. As shown by arrows A in FIG. 3B, therefore, DC erased areas (areas left erased or erased areas), which have been erased by erase head 9 and in which no data are written by read/write head 8, exist on each track of the magnetic recording medium. These erased areas exist in gap 3 are provided to prevent overlapping of sectors, as shown in FIG. 3A, and corresponds to a period the distance D between the erase gap and read/write gap divided by the linear velocity V of the magnetic recording medium on the track.

In conventional FDCs, an internal command is provided in consideration of a tunnel-erase type magnetic head, by use of which no DC erased areas are provided on the medium. Therefore, the conventional FDCs are not provided with a function to cope with the DC erased area. If noise pulses are reproduced form the DC erased area, this may cause PLL circuit 3 to oscillate locking on the noise pulses. The noise pulse are generated with an irregular frequency. When PLL circuit 3 locks on the noise pulses therefore, the locked frequency deviates significantly from the regular or controllable lock range of the PLL circuit 3, and the circuit 3 overruns. And thus, the FDC detects a read error.

With the use of the conventional FDC, at the time data is reproduced from a magnetic recording medium in which information is recorded using a pre-erase type magnetic head, a PLL circuit in a data reproduction circuit may overrun, thus causing a read error.

SUMMARY OF THE INVENTION

With the above in mind, therefore, it is an object of this invention to provide a data reproduction apparatus which can surely and quickly reproduce data from a magnetic recording medium in which information is recorded by a pre-erase type magnetic head.

To achieve the above object, a data reproduction apparatus according to this invention comprises:

a magnetic disk driver (10), having a pre-erase type magnetic head (11) for reading out information from a magnetic recording medium (13), for outputting pulse signal (PS) in accordance with information read by the magnetic head (11);

a phase locked loop (PLL) circuit (25), coupled to said magnetic disk driver (10), for receiving the pulse signal (PS) and oscillating in synchronism with the pulse signal (PS) so as to output window pulses (WP);

read circuit (29, 40), coupled to said PLL circuit, for reading out data recorded in the magnetic recording medium (13) upon reception of the window pulses (WP) from the PLL circuit (25);

sync detector (21, 23), coupled to said magnetic disk driver and said PLL circuit, for detecting sync data constituted by predetermined pattern data, based on the pulse signal (PS) and then permits the PLL circuit (25) to oscillate in synchronism with the pulse signal (PS); and inhibition circuit (23, 31, 33), coupled to said magnetic disk driver (10) and said PLL circuit (25), for detecting an erased area (GAP3) upon reception of the pulse signal (PS) from the magnetic disk driver (10) and inhibiting oscillation of the PLL circuit (25) in synchronism with the pulse signal (PS) while detecting the erased area (GAP3), the erased area (GAP3) being an area which has been erased by an erase head (9) of the pre-erase type magnetic head (11) and in which no information is written by a read/write head (8) of the pre-erase type magnetic head (11).

With the above arrangement, the PLL circuit (25) of the data reproduction apparatus according to this invention will not oscillate in synchronism with pulse signal read out from an erased area which has been erased by the erase head (9) and in which no data is recorded by the read/write head (8). The PLL circuit (25) oscillates locking, for example, on a signal (from an oscillator 27) with a reference frequency. This prevents the PLL circuit from locking on pulses with an irregular cycle from the erased area and deviating significantly from its lock range to overrun. Accordingly, it is possible to prevent a read error which may otherwise occur due to such causes. Further, the DC erased area is detected on the basis of the pulse signal (PS) from the magnetic disk drive means (10). Therefore, the DC erased area can accurately be detected with less influence of noise, as compared with a case in which the DC erased area is detected on the basis of an analog signal from the magnetic head (11). In addition, the data reproduction apparatus of this invention requires a single signal from the magnetic disk driver (10), i.e., the pulse signal (PS), which facilitates the designing of an interface and reduces influence of noise which may be generated by pulling a connection cord. As the inhibition circuit (31, 33) processes the pulse signal, it can be constituted by a digital circuit, thus ensuring the construction of the circuit on a control board (20) in a single chip LSI. The above structural features facilitate to make the overall circuit compact, improve the circuit reliability and reduce dissipation power.

BRIEF DESCRIPTION OF THE DRAWINGS

FIG. 4 is a block diagram illustrating the structure of a data reproduction circuit according to one embodiment of this invention;

FIGS. 5A through 5E are diagrams for explaining the operation of the circuit shown in FIG. 4;

FIGS. 6A and 6B are diagrams for explaining an example of an erased area detection method;

FIG. 7 is a block diagram illustrating a practical example of the structure of an erased area detector shown in FIG. 4; and FIGS. 8A through 8G are diagrams for explaining the operation of the erased area detector shown in FIG. 7.

DETAILED DESCRIPTION OF THE PREFERRED EMBODIMENTS

Figure 1:
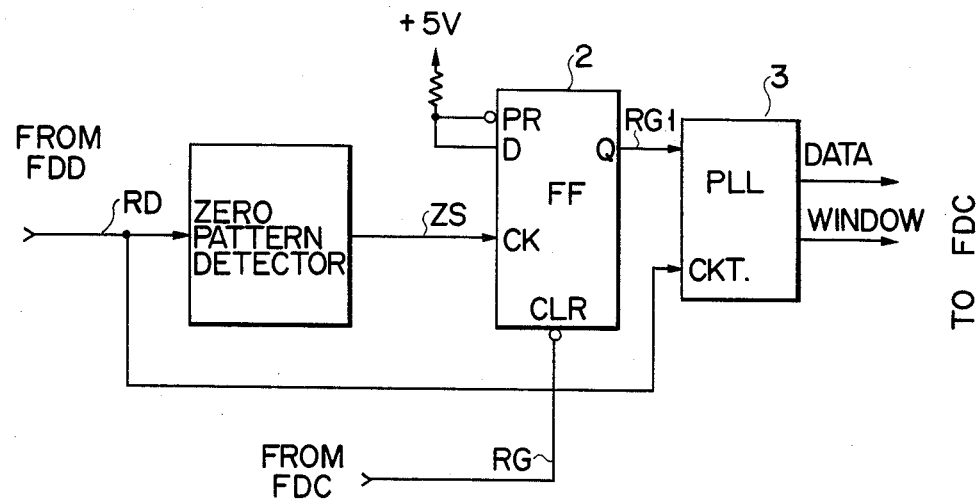
FIG. 1 is a block diagram for explaining the structure of a conventional data reproduction circuit.
Figure 2:
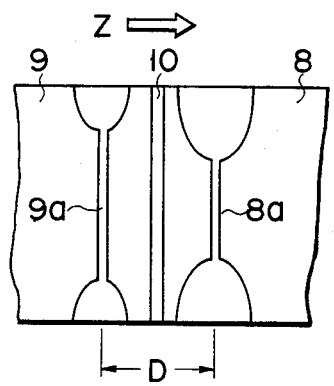
FIG. 2 is a bottom view of a pre-erase type magnetic head.

Referring to the accompanying drawings, an apparatus for reproducing data from a magnetic recording medium according to one embodiment of this invention will be explained below.

To begin with, the structure of the data reproduction apparatus will be explained with reference to FIG. 4. The data reproduction apparatus of this embodiment comprises a floppy disk drive (FDD) 10 and a reproduction circuit 20. FDD 10 reads out information recorded in a magnetic recording medium 13 and outputs a pulse signal PS corresponding to the read information. The pulse signal PS includes both data pulses and clock pulses. Reproduction circuit 20 is constituted on a FDC board disposed inside a personal computer body, etc. The FDC board may be incorporated in FDD 10. These FDD 10 and reproduction circuit 20 are coupled to each other through an interface (not shown).

The information read from magnetic recording medium 13 by a pre-erase type magnetic head 11 of FDD 10 is supplied to a pre-circuit 15 through a selector 15A. The pre-circuit 15, which comprises an amplifier, timed domain filter, etc., amplifies its input signal, converts it to the pulse signal and outputs the pulse signal.

The output pulse signal PS of pre-circuit 15 is supplied to a zero pattern detector 21 of reproduction circuit 20. The zero pattern detector 21 detects "0" data with a predetermined number of bytes (e.g., 4 bytes) from the pulse signal PS and outputs a detection signal ZS. More specifically, zero pattern detector 21 detects sync areas SYNC on a track and outputs the detection signal ZS to a clock terminal CK of a D type flip-flop (D-FF). D-FF 23 has its D terminal and low-active preset terminal coupled to a power source voltage through a resistor R, and has its low-active CLR terminal supplied with the output of an AND gate 31. D-FF 23 latches a high level signal in synchronism with the rising of the output signal ZS of zero pattern detector 21. The Q output of D-FF 23 is supplied as a read gate signal RG2 to a control terminal C of a phase locked loop (PLL) circuit 25 for activating a phase lock operation thereof. The pulse signal PS is supplied to an input terminal I1 of PLL circuit 25, while a clock signal CL of a predetermined frequency from an oscillator 27 is supplied to another input terminal I2 of the PLL circuit 25.

PLL circuit 25 has a voltage controlled oscillator (not shown) provided therein, which serves to make the phases of its output pulses, window pulses WP, equal those of the data pulses of the pulses signal PS. When the read gate signal RG2 supplied to the control terminal C is at a high level, PLL circuit 25 performs the sync operation on the read pulse signal PS to output window pulses WP for separating data pulses and clock pulses from the read pulse signal PS. When the read gate signal RG2 supplied to the control terminal C is at a low level, PLL circuit 25 locks the frequency of the window pulses WP into that of the clock signal CL from oscillator 27. The pulse signal PS and window pulses WP from PLL circuit 25 are supplied to a floppy disk controller (FDC) 29. The FDC 29, which is coupled to a host CPU 40, etc., receives an instruction from host CPU 40, etc. and controls a read permit signal RG to control the read operation of the data reproduction apparatus. FDC 29 includes a data separator (not shown). And, based on window pulses WP, the data separator separates the data pulses and the clock pulses from the pulse signal PS.

Figure 3:
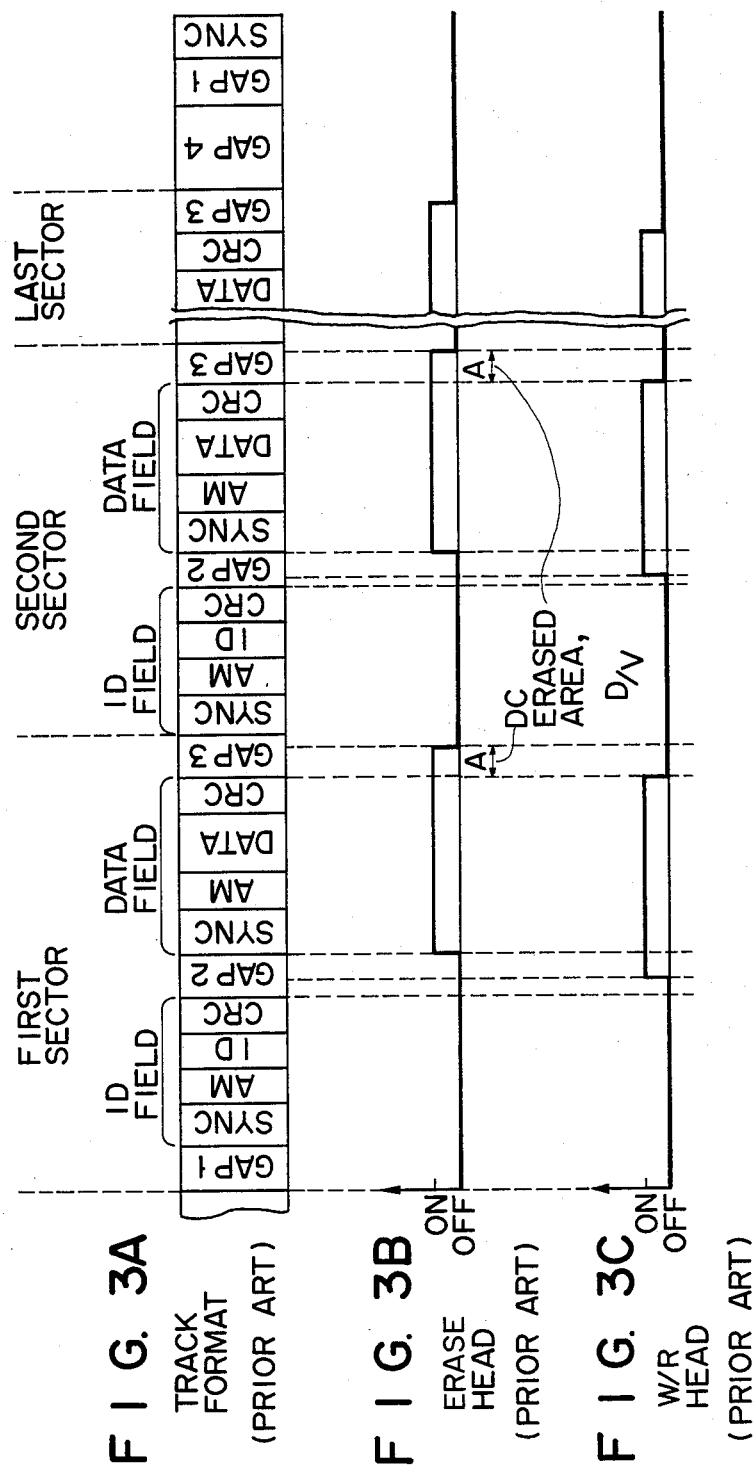
FIGS. 3A through 3C are diagrams illustrating a track format of a magnetic recording medium and the positional relationships between an erase head and a read/write head when they are ON or OFF.

The read pulse signal PS is also supplied to an erased area detector 33, which detects an DC erased area in a gap 3 of each sector on magnetic recording medium 13 shown in FIG. 3B. Upon detection of the DC erased area, erased area detector 33 supplies a detection signal ER of a low level to one input terminal of AND gate 31. This AND gate 31 receives at the other input terminal the read permit signal RG from FDC 29.

Write data WD and a write gate signal WG from FDC 29 are supplied to a write circuit 17 provided in FDD 10. The write circuit 17 controls selector 15A, supplies an analog signal corresponding to the write data WD to magnetic head 11 and writes data indicated by the write data WD into magnetic disk 13.

Referring now to FIGS. 5A to 5E, the operation of FDD 10 and reproduction circuit 20 shown in FIG. 4 will be explained.

When an instruction commanding data readout is output from host CPU 40, FDC 29 supplies a signal commanding a seek operation to a motor driver (not shown), which in turn drives a stepping motor for driving a carriage (not shown) with the head 11 along a radial direction of disk 13 to position the head 11 on a target track. The operation of the stepping motor causes magnetic head 11 to move on disk 13 to the target track. When magnetic head 11 is positioned on the target track, the data readout starts.

First, FDC 29 outputs the permit signal RG of high level as shown in FIG. 5B. The output signal of magnetic head 11, which is read from the disk 13, is supplied to pre-circuit 15 through selector 15A. The signal which has been subjected to amplification and pulse conversion in pre-circuit 15 is supplied to reproduction circuit 20 as the read pulse signal PS. Since erased area detector 33 does not detect the DC erased area at the beginning, it outputs the detection signal ER of high level as shown in FIG. 5D. Upon reception of the high level permit signal RG and high level detection signal ER, AND gate 31 outputs a high level signal to the clear terminal CLR of D-FF 23 so as to make D-FF 23 operative and set it ready for receiving the detection signal ZS. A sector address data of each sector is recorded in the ID field of the sector. Until the magnetic head reaches the target n-th sector, data on the ID field of each sector is only read. The FDC 29 compares a target sector address identifying the n-th sector stored therein with the sector address read from each ID field, and thus searches the target n-th sector. Reading of the sector address from each sector is performed as mentioned below.

When FDD 10 outputs pulse signal PS reproduced from the sync area SYNC of each sector, zero pattern detector 21 detects a predetermined clock pulse train and outputs the detection signal ZS. Upon reception of the detection signal ZS, D-FF 23 outputs the high level read gate signal RG2 (see FIG. 5E) to PLL circuit 25.

In response to this high level signal RG2, PLL circuit 25 locks on the pulse signal PS so as to oscillate, and then outputs the window pulses WP synchronized with the data pulses in the pulse signal PS, with the pulse signal PS. Based on the window pulses, FDC 29 separates the data pulses and clock pulses from the pulses signal PS, and FDC 29 reads out the data pulses which is recorded in the address mark area AM, identifier area ID and cyclic redundancy check area CRC of the ID field.

For example, if $\mu$PD 765 made by Nippon Electric Corp. is used as the FDC 29, the permit signal RG is kept at the high level until the target sector address stored in FDC 29 coincides with the read sector address in the FDC 29.

When the target sector address stored in FDC 29 coincides with the read sector address in the FDC 29, the permit signal RG is set to low level, and clear the first D-FF 23. And then, FDC 29 output the high level permit signal RG again.

That is to say, when magnetic head 11 completes reading the data of the ID field, thus reaching GAP2, the permit signal RG temporarily becomes a low level as shown in FIG. 5B. The GAP2 is necessary to change the operation mode of the magnetic head from the read mode to the write mode when FDC 29 executes a write operation. Upon reception of the low level permit signal RG, AND gate 31 outputs an low level signal so that D-FF 23 is cleared to put the read gate signal RG2 at an low level. Consequently, PLL circuit 25 locks on the clock pulse CL from oscillator 27.

As shown in FIG. 5B, the permit signal RG becomes high level again after a period of several bytes (the period corresponding to the GAP2), which starts the read operation for the data field.

The read operation of the data field, similar to that of the ID field, is performed in the following procedures. Zero pattern detector 21 detects the sync area and outputs the detection signal ZS, setting the read gate signal RG2 at the high level. Upon reception of this signal RG2, PLL circuit 25 changes the signal to lock on from the clock pulse CL to the pulse signal PS. Then, FDC 29 receives the pulse signal PS, and window pulses WP synchronized with the pulse signal PS. Using the window pulses, FDC 29 separates the data pulses and the clock pulses from the pulse signal PS, and sequentially reads out information recorded in the address mark area AM, data area DATA and cyclic redundancy check area CRC, which follow the sync area SYNC.

In the case that when magnetic head 11 reaches each DC erased area, erased area detector 33 detects that an irregular pulse train is in the pulse signal PS and outputs the low level detection signal ER as shown in FIG. 5D. When AND gate 31 receives this signal ER, its output signal becomes the low level, thus clearing D-FF 23. As a result, the read gate signal RG2 from D-FF 23 in the GAP3 becomes the low level, as shown in FIG. 5E. Therefore, PLL circuit 25 locks on the clock pulses CL from oscillator 27, not on the pulse signal PS.

The above completes the data readout from the target n-th sector, and FDC 29 performs the above operations for the next target sector.

As explained above, according to the data reproduction circuit, when magnetic head 11 reaches the DC erased area in GAP3, the read gate signal RG2 becomes the low level. Consequently, PLL circuit 25 will not lock on pulses with an irregular frequency of noise pulses from the DC erased area.

With regard to other sector than the target sector, for example, the (n−1)-th sector in FIG. 5A, when its DC erased area is detected, the read gate signal RG2 becomes the low level so that PLL circuit 25 stops locking on the read pulse signal PS until the sync area SYNC is detected.

By repeating the operation with respect to the erased area, at the time data is read from a magnetic recording medium, it is possible to prevent PLL circuit 25 from overrunning due to the circuit 25 locking on pulses of an irregular frequency from the DC erased area. Accordingly, this can prevent the occurrence of a data reproduction error due to wild running of PLL circuit 25.

In the above embodiment, the DC erased area is detected on the basis of read pulse signal PS supplied from FDD 10. Therefore, the DC erased area can accurately be detected with less influence of noise, as compared with a case in which the DC erased area is detected on the basis of an analog signal from the magnetic head 11. In addition, the data reproduction apparatus of this invention requires a single signal from FDD 10, which facilitates the designing of an interface and reduces influence of noise which may be generated by pulling a connection cord. As the erased area detector 33 processes a pulse signal, it can be constituted by a digital circuit, thus ensuring the construction of the circuit on FDC board 20 in a single chip LSI. The above structural features facilitate to make the overall circuit compact and improve the circuit reliability.

An example of a method for erased area detector 33 (see FIG. 4) to detect the DC erased area will be explained below with reference to FIGS. 6A and 6B. The MFM system is typically used for modulating data in a FDD today. According to the MFM system, the pulses included in the read data RD have three frequencies, 1f, 1.5f and 2f (f is a reference frequency). With regard to the DC erased area, no data is recorded in, so that the pulses included in a signal reproduced from the DC erased area are noise-originated and the pulse frequencies are of a random type. That is, there exist pulses with frequencies below 1f and above 2f. Further, in the MFM system, the minimum frequency 1f is repetition of data "1" and data "0." In consideration of the repetition of the resultant data "10," the window pulses WP and the pulse signal PS representing data "101" would have the relationships as shown in FIGS. 6A and 6B.

With T0 being the pulse width of the window pulse WP, the interval of the data with a 1f frequency is $4 \times T0$ ($1f = 1/(4T0)$). In addition, the timing for outputting the data pulses varies by $\Delta t$ by jittering. When the variation $\Delta t$ is greater than $T0/2$, the data will not be detected and the data is in error. The maximum pulse interval D of the data pulses DP is for the case where the data pattern "10" is repeated and is expressed as $D = 4 \cdot 33 \ T0 + (\frac{1}{2})T0 \times 2 = 5 \times$ "T0. Therefore, the pulse interval of the pulses included in the pulse signal PS does not exceed the interval D; if the pulse interval is greater than D, it can be assumed that the pulses do not conform to the MFM regulations. If pulses with this abnormal pulse interval are detected, therefore, it can be assumed that the pulse signal PS has been reproduced from the DC erased area.

A practical structure of erased area detector 33 to which the above principle is applied will now be explained referring to FIG. 7. The pulse signal PS is supplied to the clock terminal of a first flip-flop (D-FF) 331. The first D-FF 331 has its Q output supplied to the clear terminal CLR of a first counter 333 and has its $\overline{Q}$ output supplied to the clear terminal CLR of a second counter 335 and to the D terminal of first D-FF 331. The outputs of counters 333 and 335 are supplied to a two-input NOR gate 337 whose output is supplied to the clear terminal CLR of a low-active second D-FF 339. A source voltage is applied to the low-active clear terminal and preset terminal of first D-FF 331 and the low-active preset terminal and high-active D terminal of second D-FF 339 through the respective resistors. In addition, first and second counters 333 and 335 and second D-FF 339 have their clock terminals CK supplied with a clock signal of a predetermined frequency.

Referring now to FIGS. 8A to 8G, the operation of the erased area detector shown in FIG. 7 will be explained.

Upon reception of the pulse signal PS shown in FIG. 8A, first D-FF 331 outputs signals each having a level inverted in synchronism with the rising of the other output signal. First counter 333 measures the period where the Q output is at the low level (i.e., the period from an even-number pulse to an odd-number pulse) and outputs an high level signal when the measured value exceeds a set value t1. Second counter 335 measures the period where the $\overline{Q}$ output is at the low level (i.e., the period from an odd-number pulse to an even-number pulse) and outputs an high level signal when the measured value exceeds a set value t1. Since only the period between the third and fourth pulses is greater than the period t1 in FIG. 8A, the output of first counter 333 is kept at the low level as shown in FIG. 8E and the output of second counter 335 becomes the high level upon elapse of the period t1 after the third pulse is output. When the output of first counter 333 or second counter 335 becomes the high level, NOR gate 337 outputs an low level signal. In response to this low level signal, second D-FF 339 is cleared and outputs the low level detection signal ER. The detection signal ER is kept at the low level until the next pulse is generated in the pulse signal PS and thereafter the clock pulse CK rises, as shown in FIG. 8B.

The structure of erased area detector 33 of FIG. 4 is not limited to the one shown in FIG. 7. For instance, in FIG. 7, a pulse interval greater than a predetermined interval is detected; however, with the same structure, the pulse signal PS can be considered to be reproduced from the erased area when pulses with a pulse interval smaller than a predetermined value. The above two detection systems may be combined.

The frequency of the clock pulse CL in FIG. 4 may be lower than the frequency of the pulse signal PS reproduced from the sync area SYNC. In the above embodiment, PLL circuit 25 locks on the clock pulse CL when the read gate signal RG2 is at the low level. However, the locking action is not limited to the above; PLL circuit 25 may lock on the frequency of the read data RD immediately before the level of the read gate signal RG2 changes to the low level.

In a writing operation, FDC 29 supplies the write permit signal WG and write data WD to write circuit 17. The write circuit 17 controls selector 15A to supply an analog signal corresponding to the write data to the read/write head and supply a DC current to the erase head. Magnetic head 11 uses the erase head to erase data on the target track and then uses the read/write head to write the write data on the track.

NEC μPD 765 is known to serve as FDC 29, but any other FDC having the equivalent function of this IC can be also used.

Another type of FDC 29 is also known. In such FDC, if the target sector address does not coincide with the read sector address from each ID field in the FDC, the FDC temporarily resets the read permit signal RG to low level. And then, when a sync signal from the next ID field is detected therein, the FDC outputs the read permit signal of high level. In this type of FDC, since the read get signal RG1 is not output when the head 11 is in the GAP3 area, the DC erased areas do not influence the phase locking operation by PLL circuit 25, generally. Even in this case, however, if a train of "0" is recorded as data in DATA field as well as the sync area, the FDC outputs the read permit signal of high level by missunderstanding the train in data as the sync data. Therefore, above embodiments have advantages on such type of FDC.

This invention is not limited to the use of a flexible magnetic recording medium, but can be applied to any data reproduction apparatus using a so-called hard disk as long as the apparatus reproduces data recorded by a pre-erase type magnetic head.

What is claimed is:

1. A data reproduction apparatus for reading out information recorded on a recording medium, said apparatus comprising:
    a magnetic disk drive means, having a pre-erase type magnetic head for reading out information from a magnetic recording medium, for outputting read data, which is a pulse signal, in accordance with information read by said magnetic head;
    a phase locked loop (PLL) circuit means, coupled to said magnetic disk drive means, for receiving said read data and oscillating in synchronism with said read data so as to output window pulses;
    read means, coupled to said PLL circuit means, for reading out data recorded in said magnetic recording medium upon reception of said window pulses from said PLL circuit means;
    sync detecting means, coupled to said magnetic disk drive means and said PLL circuit means, for detecting sync data constituted by predetermined pattern data, based on said read data and then permits said PLL circuit means to oscillate in synchronism with said read data; and
    inhibition means, coupled to said magnetic disk drive means and said PLL circuit means, for detecting an erased area upon reception of said read data and inhibiting oscillation of said PLL circuit means in synchronism with said read data while detecting said erased area, said erased area being an area which has been erased by an erase head of said pre-erase type magnetic head and in which no information is written by a read/write head of said pre-erase type magnetic head.

2. The data reproduction apparatus according to claim 1, wherein said inhibition means comprises:
    erased area detecting means, coupled to said magnetic disk drive means, for detecting said erased area based on said read data so as to output an erased area detection signal; and
    means, coupled to said erased area detecting means and said sync detecting means, for outputting to said sync detecting means a signal for inhibiting said PLL circuit means from performing a sync operation on said read data, upon reception of said erased area detection signal.

3. The data reproduction apparatus according to claim 2, wherein said erased area detecting means comprises:
    means, coupled to said magnetic disk drive means, for detecting a pulse interval of pulses included in said read data upon reception of said read data; and
    means, coupled to said pulse interval detecting means, for outputting said erased area detection signal when said pulse interval is out of a predetermined range.

4. The data reproduction apparatus according to claim 2, wherein said erased area detecting means comprises:
    means, coupled to said magnetic disk drive means, for detecting a pulse interval of pulses included in said read data upon reception of said read data; and
    means, coupled to said pulse interval detecting means, for outputting said erased area detection signal when said pulse interval is greater than a predetermined pulse interval.

5. The data reproduction apparatus according to claim 1, wherein said sync detecting means comprises:
    circuit, coupled to said magnetic disk drive means, for detecting a sync area on said magnetic recording medium based on said read data so as to output a sync area detection signal; and
    means, coupled to said sync area detecting circuit, for outputting a signal instructing said PLL circuit means to lock on said read data upon reception of said sync area detection signal.

6. The data reproduction apparatus according to claim 1, wherein said data reproduction apparatus comprises oscillation means, coupled to said PLL circuit means, for outputting a signal with a predetermined frequency, and
    said PLL circuit means locks on said output signal of said oscillation means to oscillate when said inhibition means inhibits said PLL circuit means from locking on said read data to oscillate.

7. The data reproduction apparatus according to claim 2, wherein said read means comprises controller means for controlling data recording and reading operations on said magnetic recording medium upon reception of an instruction from a host system,
    said controller means outputs a read permit signal instructing a readout of information from said magnetic recording medium in accordance with said instruction, and
    said inhibition means for, upon reception of said permit signal, inhibiting said PLL circuit means from locking on said read data while said permit signal is not output and said erased area is detected.

8. The data reproduction apparatus according to claim 1, wherein said sync detecting means comprises zero pattern detecting means for detecting predetermined zero pattern data from said read data so as to output a zero pattern detection signal and flip-flop means for outputting a read gate signal of a predetermined level with said detection signal from said zero pattern detecting means being as a trigger pulse, said PLL circuit means, upon reception of said read gate signal from said flip-flop means, locks on said read data so as to generate said window pulses from said read data during a period in which said read gate signal is being output, said read means comprises a disk controller, coupled to a host system, for outputting a read permit signal for specifying a data read operation upon reception of an instruction from said host system, and for reading out data recorded on said magnetic recording medium based on said window pulses, and said inhibition means comprises erased area detecting means for detecting said erased area on said magnetic recording medium so as to output an erased area detection signal based on said read data, and gate means for, upon reception of said erased area detection signal and said permit signal, outputting a clear signal to said flip-flop means when said erased area detecting means detects an erased area and said permit signal does not specify data readout.

9. A data reproduction apparatus for reading data recorded on a magnetic recording medium, said apparatus comprising:

magnetic disk drive means, having a pre-erase type magnetic head for reading out information from a magnetic recording medium, for outputting read data, which is a pulse signal, in accordance with information read by said magnetic head;

zero pattern detecting means, coupled to said magnetic disk drive means, for detecting sync data constituted by zero data of a predetermined number of bits so as to output a detection signal, based on said read data;

flip-flop means, coupled to said zero pattern detecting means, for, upon reception of said detection signal from said zero pattern detecting means, outputting a predetermined permit signal with said detection signal as a trigger pulse;

phase locked loop (PLL) circuit means coupled to said flip-flop means, for receiving said permit signal and said read data, and locking on said read data to oscillate so as to output window pulses when said permit signal is output;

controller means, coupled to said PLL circuit means, for reading out data recorded on said magnetic recording medium upon reception of said window pulses;

erased area detecting means, coupled to said magnetic disk drive means, for detecting an erased area based on said read data, said erased area being an area which has been cleared by an erased head of said pre-erase type magnetic head and in which no information is written by a read/write head of said pre-erase type magnetic head; and inhibition circuit means, coupled to said erased area detecting means and said flip-flop means, for inhibiting said flip-flop means from outputting said permit signal in order to prevent said PLL circuit means from locking on said read data reproduced from said erased area.

10. The data reproduction apparatus according to claim 9, wherein said erased area detecting means comprises:

means, coupled to said magnetic disk drive means, for detecting a pulse interval of pulses included in said read data upon reception of said read data; and means, coupled to said interval detecting means, for outputting said erased area detection signal when said pulse interval is out of a predetermined range.

11. The data reproduction apparatus according to claim 9, wherein said erased area detecting means comprises:

means, coupled to said magnetic disk drive means for detecting a pulse interval of pulses included in said read data upon reception of said read data; and means, coupled to said interval detecting means, for outputting said erased area detection signal when said pulse interval is greater than a predetermined pulse interval.

* * * * *